July 16, 1935.  G. A. GRAB  2,008,324
LUMBER CARRIER WITH FRONT LIFT
Filed July 7, 1934   4 Sheets-Sheet 1
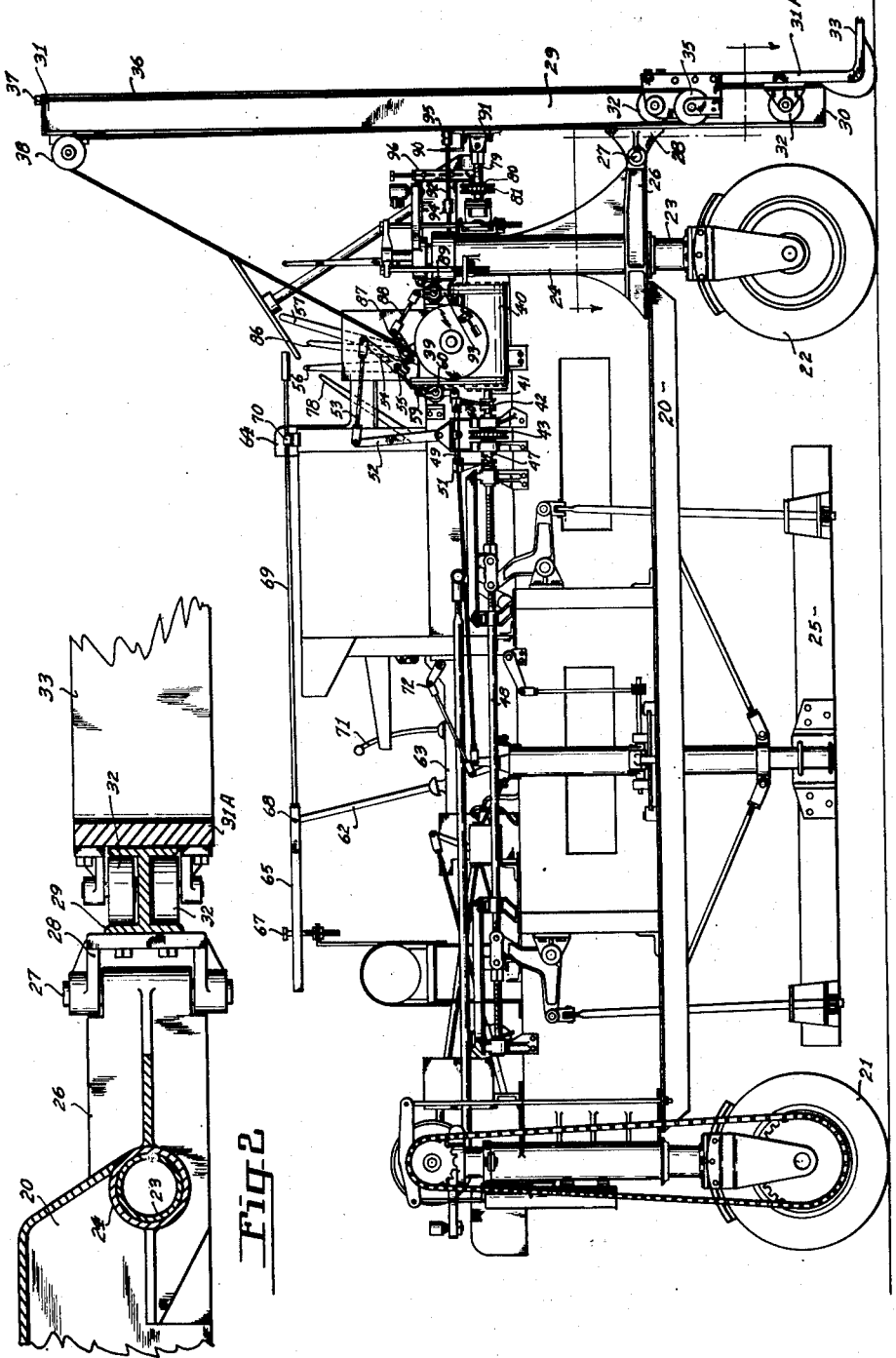
GUSTAV A. GRAB
INVENTOR
ATTORNEY

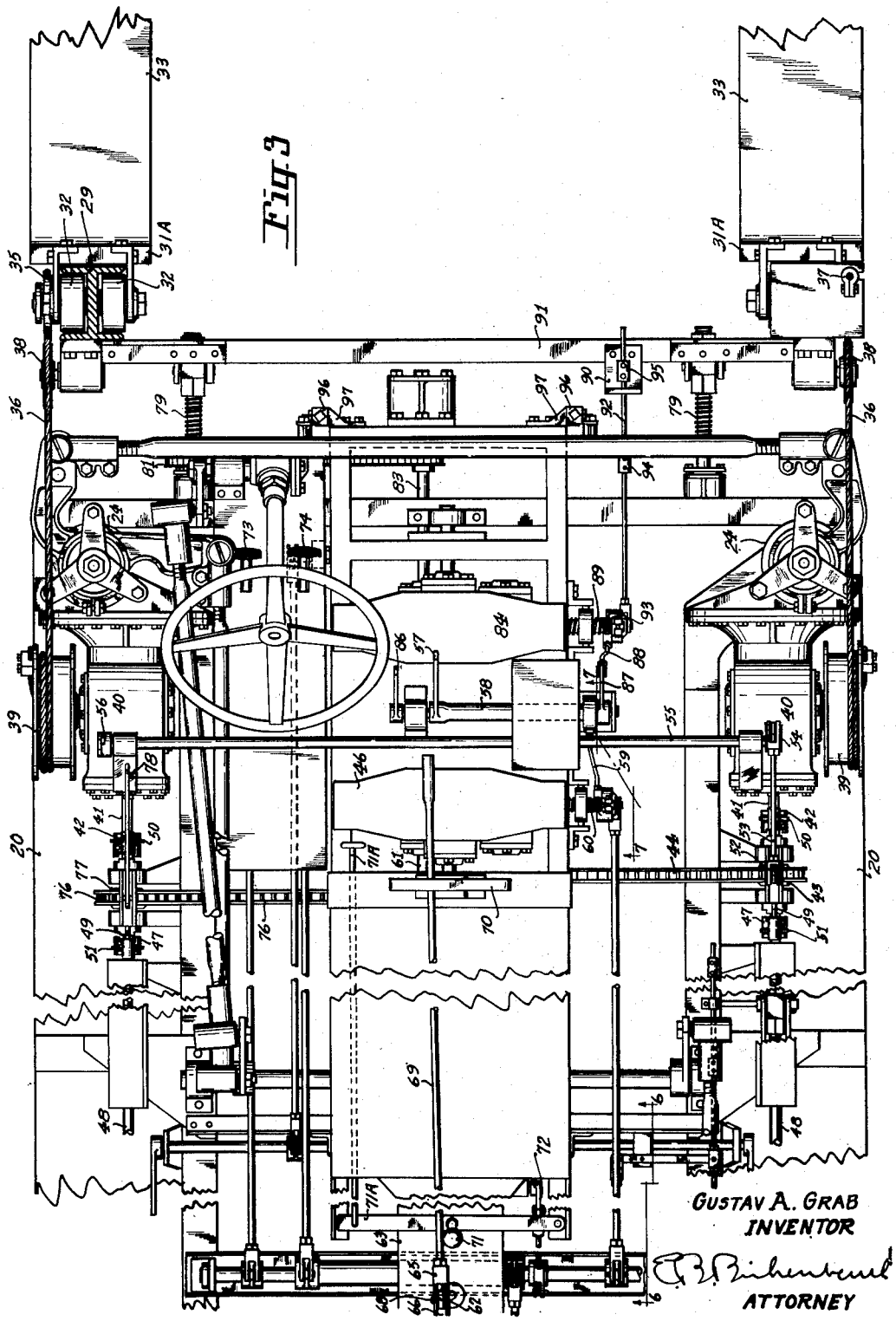

July 16, 1935. G. A. GRAB 2,008,324
LUMBER CARRIER WITH FRONT LIFT
Filed July 7, 1934 4 Sheets-Sheet 3
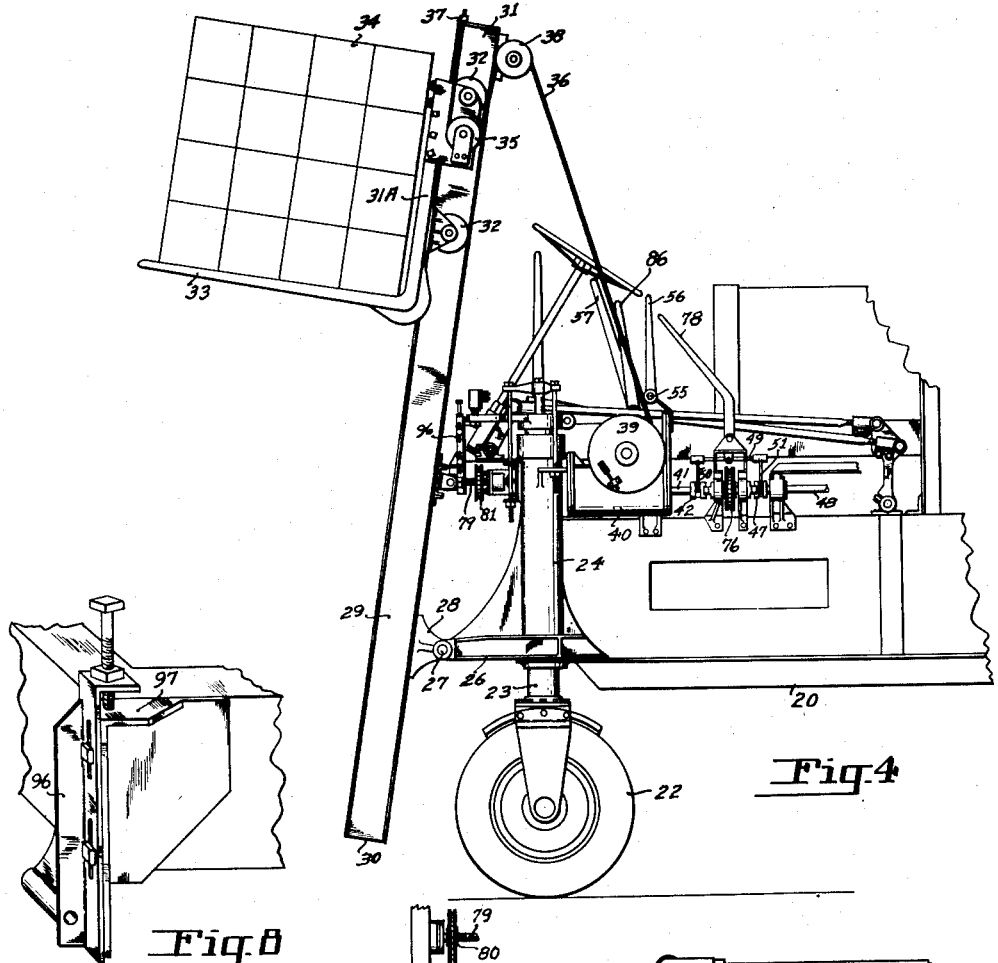
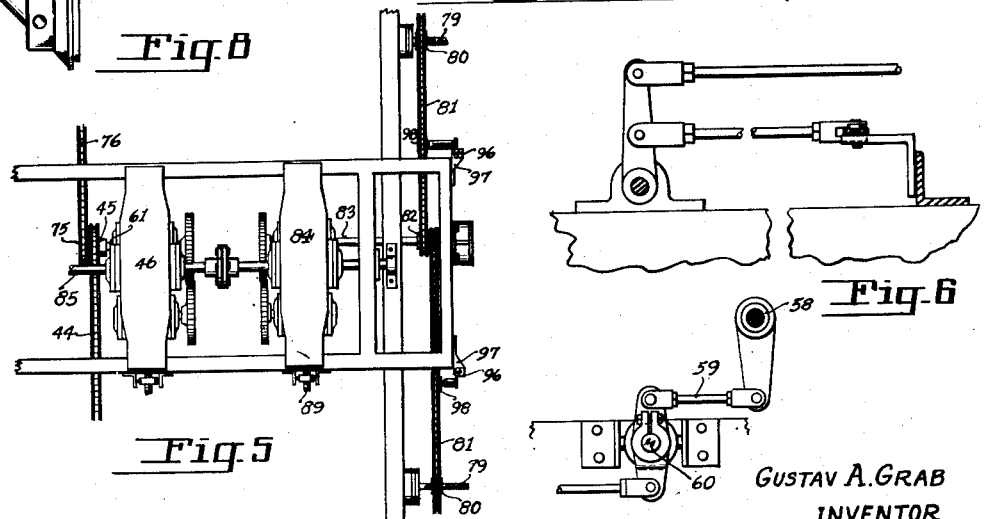
Gustav A. Grab
INVENTOR
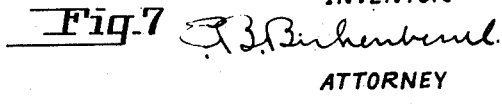
ATTORNEY July 16, 1935.                G. A. GRAB                2,008,324
               LUMBER CARRIER WITH FRONT LIFT
                Filed July 7, 1934    4 Sheets-Sheet 4

GUSTAV A. GRAB
INVENTOR
ATTORNEY

Patented July 16, 1935

2,008,324

UNITED STATES PATENT OFFICE 2,008,324

LUMBER CARRIER WITH FRONT LIFT

Gustav A. Grab, Portland, Oreg., assignor to Willamette-Hyster Company, Portland, Oreg.

Application July 7, 1934, Serial No. 734,215

4 Claims. (Cl. 187—11)

This invention relates generally to lumber carriers, and particularly to one having a front lift.

The main object of this invention is to provide a lumber carrier of the straddle type with a pair of lifting elements in alignment with the wheels thereof.

The second object is to provide a lumber carrier with a front lift mechanism by means of which relatively heavy and elongated objects or packages may be handled from one side and intermediate the ends thereof.

The third object is to so construct the lift that it can be attached to a carrier of the straddle type and operated without in any way interfering with the mechanism of the carrier, or being hampered by the presence of the necessary carrier mechanism.

The fourth object is to so construct the lifts that they may be operated in unison or separately, and that they may be tilted in the direction of the carrier for the purpose of drawing the center of gravity of the load being lifted nearer to the vertical center line of the adjacent carrier wheels.

The fifth object is to greatly extend the field of usefulness of the usual straddle type of lumber carrier by making it possible to use same as a lumber piler and for elevating lumber or packages to heights not possible when the carrier is used in the ordinary manner, that is, in straddle fashion.

The sixth object is to so construct the lifts for the lumber carrier that they may be utilized not only for elevating and transporting purposes, but also for the purpose of handling heavy objects, for example, such as placing sills on tiers or moving a given object laterally.

The seventh object is to so construct the lifts that the operating mechanism thereof will be irreversible, that is, that same will be capable of holding the load in any position to which it is driven.

These, and other objects, will become more apparent from the specification following as illustrated in the accompanying drawings, in which:

Fig. 1 is a side elevation of the carrier showing the front lift in its lowermost position.

Fig. 2 is a horizontal section along the line 2—2 in Fig. 1.

Fig. 3 is a fragmentary horizontal plan showing the front lifts and related carrier mechanism.

Fig. 4 is a fragmentary side elevation of the forward end of the carrier showing the front lift tilted back and the load elevated.

Fig. 5 is a fragmentary plan showing the transmissions and hoist tilting mechanism.

Fig. 6 is a transverse section along the line 6—6 in Fig. 3.

Fig. 7 is a transverse section along the line 7—7 in Fig. 3.

Fig. 8 is a perspective view showing the chain tightening mechanism.

Similar numbers of reference refer to similar parts throughout the several views.

Figure 10:
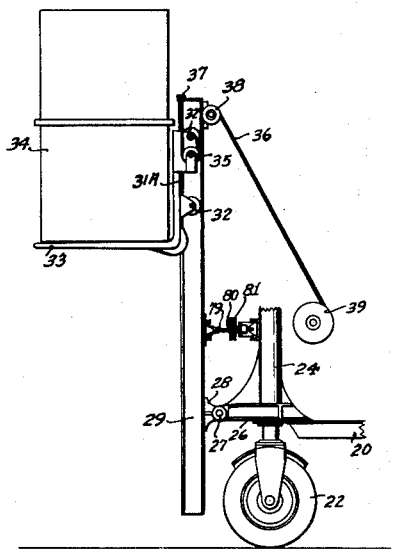
Fig. 10 is a side elevation of the front lift mechanism showing a load in elevated position.

Before entering into a description of this invention attention is drawn to my United States Patent Number 1,798,412, which illustrates the type of carrier referred to in this invention.

Briefly, same consists of a straddle frame 20 which is supported by the driving wheels 21 and the steering wheels 22, the latter of which are mounted on spindles 23 within the upright housings 24 which form a part of the frame 20.

With this type of carrier the lumber is normally carried by the grappling bars 25 which are operated and controlled by suitable mechanism illustrated but not specifically described herein.

Projecting from each of the housings 24 is a horizontal standard 26 on the forward end of which is a pivot 27 to which is attached a bracket 28. To each bracket 28 is attached an upright guide 29 which, in this instance, is in the form of an I beam. Its lower end 30 extends almost to the ground, and its upper end 31 extends well above the top of the lumber carrier.

Mounted on each guide 29 is a package carrier 31A provided with wheels 32 which occupy the channels on opposite sides of the guide 29. On the lower end of each carrier 31 is formed a forwardly extending foot 33 which is sufficiently strong to support the maximum load 34 intended to be handled by the device.

On each carrier 31A ies mounted a sheave 35. A cable 36 has its end 37 fastened to the upper end of its respective guide 29 and passes around a sheave 35, then around a second sheave 38 which is mounted at the upper end of the guide 29, and then downwardly to a cable winding drum 39 which is mounted on the lumber carrier.

It will be understood that each of the guides 29 is provided with its own cable winding mechanism.

Each drum 39 is driven by a transmission contained within the housing 40. It will be understood that these transmissions are of the irreversible type—that is, the drums 39 must be positively driven in each direction in order to permit the cables 36 to unwind, or to cause them to be wound upon the drums.

The drum operating transmission contained within the right hand housing 40 is driven by a shaft 41 through the jaw clutch 42 from the sprocket wheel 43 whose chain 44 is driven from the drive sprocket 45 of the hoisting mechanism 46. The sprocket wheel 43, through the clutch jaw 47, also drives the right hand threaded shaft 48 which, through its associated mechanism, drives the right hand grappling bar 25, all of the details of which are described in my previously mentioned patent and do not form a special part of this invention.

Disposed above the sprocket 43 is a shifter rod 49 to which is attached a fork 50 which operates the jaw clutch 42. On the shifter rod 49 is a second fork 51 which operates the jaw clutch 47. Motion is applied to the rod 49 by means of a lever 52 which is attached by a connecting link 53 to a lever 54 on the rock shaft 55, which is operated by the right hand jaw clutch lift lever 56.

When the lever 56 is moved forward from the position shown in Fig. 1 the jaw 42 brings the sprocket 43 into driving relationship with the drum 39 in readiness to apply the lifting friction clutch lever 57 which, through the telescopic sleeve 58 and link 59 and the screw thrust mechanism 60, engages the clutch of the reversible hoisting transmission 46 set forth in detail in my United States Patent Number 1,838,939, causing it to drive the chain 44 and, through the jaw clutch 42, to drive the drum 39 and consequently wind or unwind the cable 36, depending upon the direction the shaft 61 is being rotated; this being controlled by the screw mechanism 60. The gear shift lever 62 of the transmission 63 is of the conventional type.

As a convenient means for operating the lever 62 from the driver's seat 64 at the forward end of the lumber carrier there is attached to the lever 62 a slotted bar 65 through whose slot 66 extends the pivot pin 67. The bar 65 is attached to the gear shift lever 62 by means of a pin 68 and has projecting forwardly therefrom an elongated gear shift rod 69, which is transversely and longitudinally slidable in the guide 70.

There is also provided a compound gear shift lever 71 with an extension 71—A by means of which it can be operated from the driver's seat. The usual clutch mechanism 72 operable from the pedal 73, as well as the brake pedal 74 are also indicated.

From the hoisting mechanism 46 is also driven a sprocket 75 whose chain 76 drives a sprocket wheel 77 on the left hand side of the lumber carrier where it drives a group of parts which are the exact duplicate of the parts 41 to 49. These parts on the left hand side of the machine, however, are controlled by a lifting jaw clutch lever 78.

It will be understood that the operation of the lever 78 in a forward direction will cause the left hand carrier 31A to move vertically in a direction corresponding with the position of the lever 57, as previously stated, and a movement of the lever 78 in the opposite direction will transmit rotation to the left hand shaft 48 causing a reversal in the drive from the hoist 46.

From the foregoing it can be seen that by operating the levers 56 and 78 forwardly, either separately or in unison, and then operating the friction clutch lever 57 in the desired direction, the feet 33 will be propelled up or down as the case may be.

Referring now to the tilting mechanism it will be noted that the guides 29 are capable of rocking on the pivots 27. In order to control this rocking action there is provided a pair of screw jacks 79, one at each side of the lift, the base of each jack being mounted at the upper end of its respective housing 24. Each jack 79 is provided with an operating sprocket 80 whose chain 81 passes around the drive sprocket 82 on the shaft 83 which is driven by the tilting transmission 84, which is substantially a duplicate of the transmission 46, both of them being driven from the same power shaft 85 from the main transmission 63.

Obviously, it is desirable to tilt both of the sides of the lift together, therefore one tilting lever 86 operating through the rock lever 87 and connecting link 88, rocks the screw 89 of the transmission 84 causing it to rotate the shaft 83 in one direction or the other, depending upon the direction in which the lever 86 is moved thereby causing the guides 29 to swing in unison at all times.

Owing to the position of the drums 39 with relation to the guides 29, the cables 36 serve as braces for the members 29.

In order to prevent injury to the parts by excessive operation in either direction of the lift swinging mechanism there is provided an automatic stop which consists of a bracket 90 mounted on the cross tie 91 disposed between the guides 29. Slidably passing through the bracket 90 is a rod 92 which is connected to the lever 93 which, in turn, is fastened on the screw 89 of the transmission 84. On the rod 92 are placed the stops 94 and 95.

When the cross tie 91 moves outwardly to its limit the bracket 90 engages the stop 95 and actuates the screw 89 to set the tilting transmission 84 in a neutral position, where it will remain until its position is reversed by means of the tilting lever 86. The same is true of an excessive inward movement of the foot 33 which would cause the stop 94 to engage the bracket 90 and bring the transmission 84 to a neutral position.

In order to maintain the desired tension on the chains 81 there is provided a chain tightener such as is shown in Fig. 8, which consists of a slide 96 adjustably mounted on a guide 97 and supporting an idler sprocket 98 which engages the chain 81.

No attempt will be made to explain in detail the mechanism not specifically referred to, same being shown merely to indicate the relationship which the present invention bears to an existing type of lumber carrier.

By referring to Figs. 4, 9, 10 and 11 it will be seen that the elements which enter into the invention are relatively simple, comprising what is actually an attachment for an existing type of straddle carrier, with a pair of separate lifting shoes each of which is in longitudinal alignment with a pair of wheels, thereby making it possible to use the lumber carrier as a straddle vehicle, or instantly shifting it into use as a package elevating or lifting and transporting conveyance, by means of which the package is handled entirely from the side, as shown in Figs. 4, 9, 10 and 11.

Figure 11:
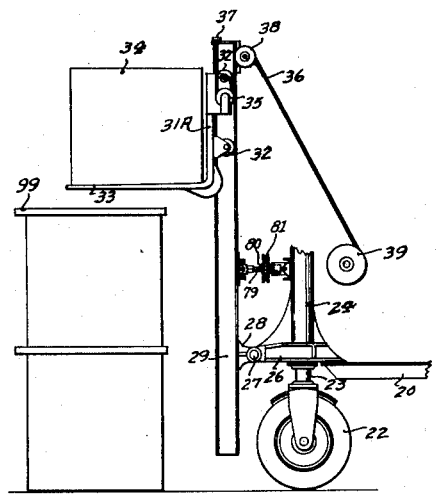
Fig. 11 is a view similar to Fig. 10 showing the carrier moved to a stack of timbers ready to deposit its load upon the top of the stack.

It will be noted in Fig. 10 that the lift is raised, holding the load in an elevated position, whereas in Fig. 11 it has moved the load to a position above a previously formed stack of material.

In the practical application of this device it is desirable to provide spacer strips 99 which are somewhat in excess of the thickness of the foot 33, permitting the feet to be withdrawn after the package is deposited upon the top of a stack, or to be reinserted when the package is again to be lifted.

Figure 9:
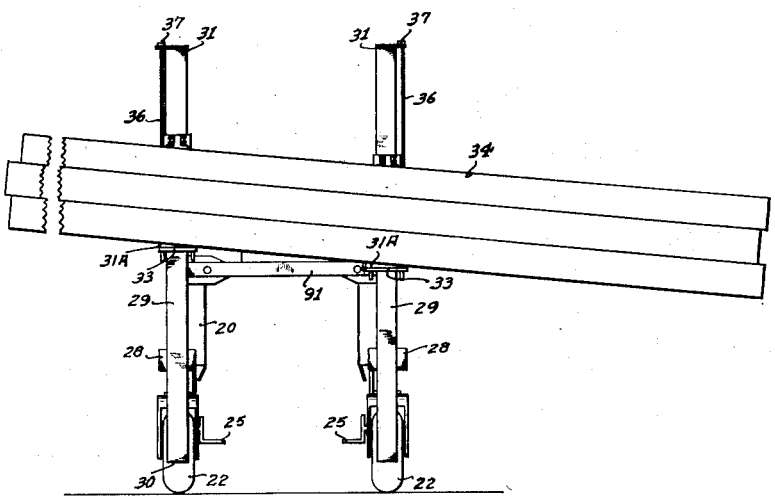
Fig. 9 is a front elevation showing the lifts handling a package in an inclined position.

It will be noted in Fig. 9 that the package is somewhat inclined. The ability of the device to so handle material greatly enhances its value by expediting the insertion of the feet 33 into the spaces between adjacent packages, and also when the device is used for the placing of timbers as for construction purposes.

It will be understood that the transmissions contained within the housings 40 are of the worm and wheel type and that the helix angle thereof is such that it is irreversible—that is, that a tension on the cable 36 will not be capable of operating the drum 39 in an unwinding direction, but that the drums 39 must be positively driven in either direction that it is desired the cable 36 shall move.

While the lifting mechanism on this device is referred to as a front lift, it is of course understood that the lift may be placed at the front or rear of these positions without departing from the spirit of this invention.

I claim:

1. A four wheeled lumber carrier having in front of each foremost wheel in longitudinal alignment therewith an upright guide, the lower portion of each upright guide being hingedly connected to the frame of the vehicle and the upper portion of each upright guide having a jack interposed between same and said vehicle, means for operating both of said jacks in unison, a wheeled carrier mounted on each guide having a horizontally projecting arm on the forward side thereof, and a separate cable winding hoist for each carrier whereby the arms may be raised independently or in unison with each other.

2. A land traveling vehicle having transversely disposed in front thereof a pair of upright spaced guides capable of being tilted in longitudinal planes, each of said guides having a slide thereon having a carrier mounted thereon provided with a forwardly extending foot, means for operating said carriers independently of each other, means for varying the inclination of said guides, and means for propelling said vehicle.

3. A carrier as described in claim 1 in which the means for operating the jacks and the cable winding hoists are operated by reversible transmissions.

4. A package handling machine comprising a self-propelled land traveling wheeled vehicle, upright guides hingedly mounted in longitudinal alignment with the wheels of said vehicle in front thereof and adapted to swing in the longitudinal vertical plane of the vehicle wheels, means for selectively moving the upper ends of said guides toward or from said vehicle, a carrier mounted on each of said guides, each of said carriers having package supporting arms projecting forwardly therefrom, housing mechanism for each of said carriers propelled from the motive power of the vehicle, and having means for independently controlling same.

GUSTAV A. GRAB.